United States Patent [19]

Sato et al.

[11] 4,131,432
[45] Dec. 26, 1978

[54] APPARATUS FOR THE TREATMENT OF GAS TURBINE EXHAUST GAS

[75] Inventors: Isao Sato; Yoshihiro Uchiyama; Youji Ishibashi; Satoshi Tsukahara; Ryoichiro Oshima; Yukio Hishinuma, all of Ibaraki, Japan

[73] Assignee: Hitachi, Ltd., Japan

[21] Appl. No.: 767,612

[22] Filed: Feb. 10, 1977

[30] Foreign Application Priority Data

Feb. 10, 1976 [JP] Japan .................................. 51-12833

[51] Int. Cl.² .......................... B01J 8/04; C10B 21/20; F01N 3/15; F01N 3/16
[52] U.S. Cl. ..................................... 422/177; 60/395; 55/220; 423/239; 422/197; 422/224
[58] Field of Search ................ 23/288 F, 284, 277 C, 23/283, 288 FB; 60/295, 301, 39.5; 55/220; 261/116; 423/238, 239

[56] References Cited

U.S. PATENT DOCUMENTS

| | | | |
|---|---|---|---|
| 3,570,472 | 3/1971 | Santangelo | 261/116 UX |
| 3,574,562 | 4/1971 | Kawahata | 23/288 F X |
| 3,795,486 | 5/1974 | Ekman | 23/284 X |
| 3,817,713 | 6/1974 | Ionescu | 23/284 |
| 3,842,615 | 10/1974 | Reigel | 261/116 X |
| 3,897,593 | 7/1975 | Fleming | 23/288 F |
| 3,905,774 | 9/1975 | Kotting | 23/284 X |
| 3,954,921 | 5/1976 | Yoshida et al. | 261/116 |
| 3,960,507 | 6/1976 | Tsujikawa et al. | 23/284 X |
| 3,989,465 | 11/1976 | Onnen | 23/284 X |
| 4,003,711 | 1/1977 | Hishinuma et al. | 23/288 F |
| 4,036,593 | 7/1977 | Satoh | 261/116 X |

Primary Examiner—Morris O. Wolk
Assistant Examiner—Michael S. Marcus
Attorney, Agent, or Firm—Beall & Jeffery

[57] ABSTRACT

A reducing agent such as ammonia, urea or hydrazine effecting selective reduction reaction with an exhaust gas from a gas turbine is injected into a duct of the turbine along with water, and at the same time compressed air from a compressor for the turbine is jetted in the duct to atomize the reducing agent. An amount of the water is controlled so that the surrounding temperature will be suitable for reduction of nitrogen oxides of the exhaust gas. The atomized reducing agent flowing in the duct is decelerated by silencers disposed in the duct, especially by a particular arrangement thereof, so that the reducing agent will be in good contact with the exhaust gas to sufficiently reduce the nitrogen oxides. Catalyst layers are used according to kinds of the reducing agent. The catalyst layers are disposed in the silencers or at the positions that the silencers are disposed.

7 Claims, 9 Drawing Figures

APPARATUS FOR THE TREATMENT OF GAS TURBINE EXHAUST GAS

BACKGROUND OF THE INVENTION

This invention relates to a method of and apparatus for treating nitrogen oxides in a gas turbine exhaust gas.

In a conbustor for a gas turbine, nitrogens in air introduced into the combustor are oxidized in its high temperature area to form nitrogen oxides (will be described hereinafter simply $NO_x$). A combustion gas including the $NO_x$ is exhausted into the atmosphere through the turbine. The $NO_x$ are poisonous to living organisms and cause a photochemically generated smog, so that prevention thereof is highly demanded. In case of the gas turbine, as methods of prevention of $NO_x$ generation known are the followings;

(1) method of preventing of $NO_x$ generation,
(2) method of reducing and decomposing the $NO_x$.

The method of 1) now is being put into a practice. The method is effected by lowering a combustion temperature since the $NO_x$ are formed proportionally to a reaction temperature, oxygen and nitrogen densities of the surroundings, and reaction continuity time, particularly the production of the $NO_x$ is exponentially proportional to the reaction temperature. The concrete methods for lowering the combustion temperature are as follows;

(a) to add non-combustion materials such as water and steam into the combustor,
(b) combustion controls such as lean fuel-air mixture combustion and two step combustion.

According to the method of 1), even if so-called thermal $NO_x$ which are formed by high temperature combustion could be reduced, fuel $NO_x$ which are formed by oxidation of nitrogen compounds contained in a fuel can not be reduced. By the method of lowering combustion temperature by adding water or steam, an amount of HC and CO generated in the combustion increases, therefore fuel consumption rate is raised whereby turbine effeciency is decreased. Further by effecting low temperature combustion employing an excess air, problems such as going out of combustion and unstable combustion occurences are accompanied, therefore it is more difficult to expect decreasing effect of the $NO_x$ than the method of adding water or steam.

Thus, there are various problems in the methods of 1), so that it is difficult to treat the exhaust gas from the turbine only by the method of 1).

On the other hand, as a method of 2) that is a method of reducing and decomposing the $NO_x$ in the exhaust gas, a method in which the $NO_x$ are reduced and decomposed to $N_2$, $CO_2$ and $H_2O$ by reaction of the $NO_x$ with reducing gases such as CO, $H_2$, $NH_3$ under an oxidation catalyst is known for example by U.S. Pat. Nos. 2,975,025 and 3,008,796 and Japanese patent publication No. 44-13002. The exhaust gas from the gas turbine includes about 15% of an excess oxygen therefore when the CO and $H_2$ in the above reducing gases are used for treatment of the exhaust gas, the CO and $H_2$ react with the oxygen before reduction of $NO_x$ so that a large amount of the CO and $H_2$ is necessary, which is uneconomical.

In case of the $NH_3$, however in a certain temperature range, reduction reaction of the $NO_x$ with the $NH_3$ is effected faster than oxidation of the $NO_x$, which is called a selective catalytic reduction reaction of the $NO_x$. Namely, the reaction of reduction of the $NO_x$ with the $NH_3$ is effected between temperatures of 250° C. and 450° C. in the presence of catalyst. When the reaction temperature is higher than 450° C., the reaction speed of oxidation of the $NH_3$ is faster and the oxidation of the $NH_3$ takes place preferentially than the reaction of reduction of the $NO_x$ to result in lowering or denitration efficiency. When the reaction temperature is lower than 250° C., the reaction speed of reduction of the $NO_x$ is lowered to also result in lowering of denitration efficiency.

Thus, since the $NH_3$ reduces selectively the $NO_x$ it is suitable for treatment of the $NO_x$ in the presence of a large amount of oxygen, but it also has a defect that the temperature range for effective denitration is limited.

Temperature of combustion gas used for the turbine is about 1000° C., and temperature of the exhaust gas exhausted from the turbine is about 500° C. However, now the combustion gas temperature tends to be further elevated, and corresponding to the increasing combustion gas temperature, the exhaust gas temperature also is elevating. Accordingly the temperature of the reaction of reduction of the $NO_x$ should be effectively controlled without decrease of turbine efficiency so that the denitration efficiency will be sufficient.

As the selective catalytic reaction of reduction of the $NO_x$ in the presence of the $O_2$, urea, hydrazine, etc. are known besides the ammonia. The hydrazine carries out nitrogen oxide reduction efficiency of 70–75%, under 450°–550° C. of reaction temperature, and without catalyzer; the urea has about 80% nitrogen oxide reduction efficiency under 450°–500° C. of the reaction temperature and in the presence of a proper catalyst.

SUMMARY OF THE INVENTION

An object of the present invention is to provide a method of and apparatus for treatment of turbine exhaust gas, which can reduce and decompose nitrogen oxides in the turbine exhaust gas employing a reducing agent.

Another object of the present invention is to provide a method and apparatus for treatment of turbine exhaust gas, which can effectively use a reducing agent without decrease of turbine efficiency.

Further another object of the present invention is to provide a method and apparatus for treatment of turbine exhaust gas, which can effectively reduce the nitrogen oxides without making the apparatus large and decreasing the turbine efficiency.

A feature of the present invention is that a reducing agent effecting selective catalytic reaction of reduction with nitrogen oxides ($NO_x$) in an exhaust gas passing through a gas turbine is injected in state of liquid into a duct for exhaust of the exhaust gas while being atomized.

As examples of the reducing agent effecting the selective catalytic reaction of reduction with the $NO_x$ in the exhaust gas from the gas turbine, the previously mentioned ammonia, urea, hydrazine etc. can be raised. In order to reduce the $NO_x$ effectively, a catalyst may be used.

DESCRIPTION OF THE PREFERRED EMBODIMENTS

Figure 3:
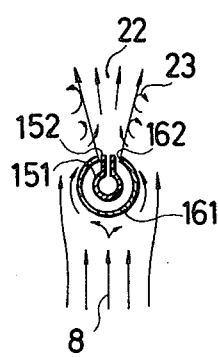
FIG. 3 is a section view of an atomizing part taken along 3,3 of FIG. 2.

An embodiment of the present invention will be described in detail referring to FIGS. 1, 2 and 3.

Figure 1:
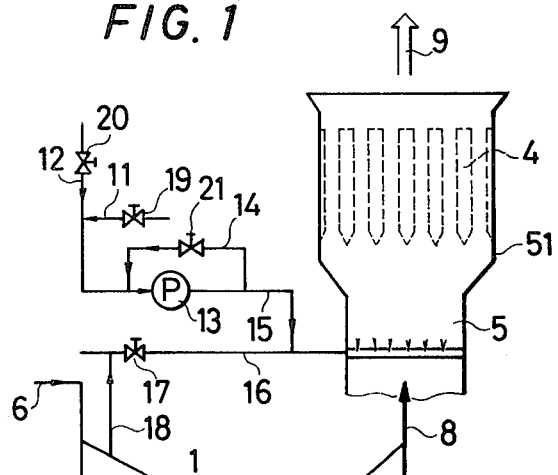
FIG. 1 is a schematic view of an embodiment of apparatus for treatment of turbine exhaust gas according to the present invention.
Figure 2:
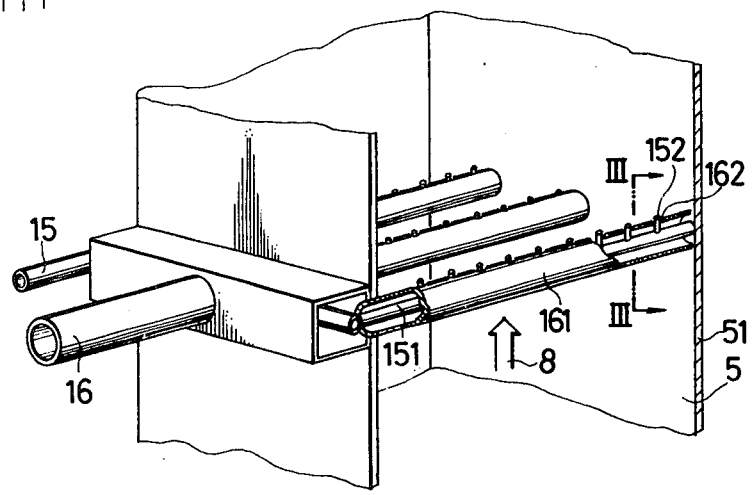
FIG. 2 is an enlarged sectional view showing the atomizing part of the apparatus of the FIG. 1.

In FIG. 1, a compressor 1 compresses air 6 and supplys it to a combustor 3 in which combustion of fuel fed therein is carried out to produce a combustion gas. The combustion gas passes through a gas turbine 2 to work therein. An exhaust gas from the turbine 2 passes through a duct 5 and is exhausted out of the duct 5 while being silenced by a plurality of silencers 4 secured to a wall 51 of the duct 5.

An atomizing device for atomizing reducing agent solution is disposed in and secured to the duct 5 in a lower portion of the silencers 4. The atomizing device comprises a plurality of air branch pipes 161 branched off from an air supply pipe 16, and a plurality of solution branch pipes 151 branched off from a solution supply pipe 15 and inserted in the air branch pipes 161. The air branch pipes 161 each are provided with a plurality of air holes 162, the solution branch pipes 151 each are provided with a plurality of nozzles 152, and the plurality of nozzles 152 each are disposed concentrically with the air hole with a gap between the nozzle and the air hole to project out of the air branch pipe 161 by a little.

The reducing agent is supplied from a pipe 11 with a regulating valve 19 to a pipe 12 for water with a regulating valve 20 thereby making a solution of the reducing agent. The solution is a little pressurized and supplied to the atomizing device by help of a pump 13, and a quantity of flow of the solution is regulated by a by-pass pipe 14 with a regulating valve 21. On the other hand, the air supply pipe 16 is provided with a regulating valve 17 and connected to a pipe 18 for extracting compressed air from the compressor 1.

With this construction, the reducing agent of ammonia (NH$_3$), hydrazine (N$_2$H$_4$), urea (CO(NH$_2$)$_2$), or the like is mixed with the water from the pipe 12 to produce a reducing agent solution which is pressurized by the pump 13, and injected into the duct 5. At the same time, the compressed air from the compressor 1 is introduced to the atomizing device through the pipe 18, the regulating valve 17 and the air supply pipe 16, and is jetted in the duct 5. Atomization of the injected solution is promoted or furthered by high velocity streams 22 of the jetted compressed air to increase frequency of contacts with the exhaust gas. Further the injected solution of fine particles is sufficiently mixed with the exhaust gas. Namely, as shown in FIG. 3, the air stream 22 and the fine particles of the solution engulfed thereby are jetted at about sonic velocity, so that pressures of the air stream adjacent to the air hole 162 is decreased, whereby the exhaust gas 8 adjacent to the air stream 22 is engulfed into the air stream 22 to produce eddies 23, thereby making enough mixture of the exhaust gas 8 and the fine particles of solution.

Thus, the atomized solution is gasified by mixing with the exhaust gas 8, its latent heat is lost and so that the temperature of the exhaust gas is lowered.

Quantities of the water and the reducing agent to be supplied are determined according to temperature and an amount of NO$_x$ of the exhaust gas, and kinds of the reducing agent so that the efficiency of denitration becomes the maximum. In case of use of the N$_2$H$_4$, which is not necessary to use any catalyst, the regulating valves 20, 19, 14 are regulated so that the amount of the N$_2$H$_4$ added will be above about one Mol per one Mol of the NO$_x$ to be treated, and the reaction temperature will be about between 450°–550° C. In case of the NH$_3$ or CO(NH$_2$)$_2$, which is used in the presence of a catalyst for example one comprising titanium as a main component, iron, molybdenum, vanaidum, iron sulfate, arrangements of which catalyst will be described in detail hereafter, the regulating valves 20, 19, 14 are adjusted so that the quantity of the reducing agent, will be about one Mol per one Mol of the NO$_x$, and the temperature of reaction will be about 450° C. for the NH$_3$ and about 450°–500° C. for the CO(NH$_2$)$_2$.

In FIG. 1, the compressed air used for atomizing the solution is between 1–2 Kg/cm$^2$ G and extracted from the low pressure stage of the compressor 1, whereby the turbine efficiency is little affected and construction of the apparatus for treatment of turbine exhaust gas becomes simple as compared with one having a particular compressor for the apparatus for treatment of turbine exhaust gas.

Figure 4:
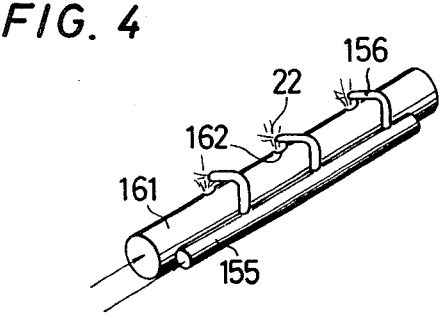
FIG. 4 is a perspective view of another embodiment of atomizing part.

FIG. 4 shows another embodiment of the atomizing device. In the device, a plurality of solution branch pipe 155 each are disposed out of and adjacent to the air branch pipe 161. The solution branch pipe 155 is provided with a plurality of nozzles 156 each of which is directed to a direction crossing the air stream 22 jetted from the air hole 162 of the air branch pipe 161, whereby promotion of the atomization of the solution is carried out more than that of FIG. 1. The effect of mixing of the atomized solution with the exhaust gas due to eddies is obtained as much as the atomizing device of FIG. 1.

Figure 5:
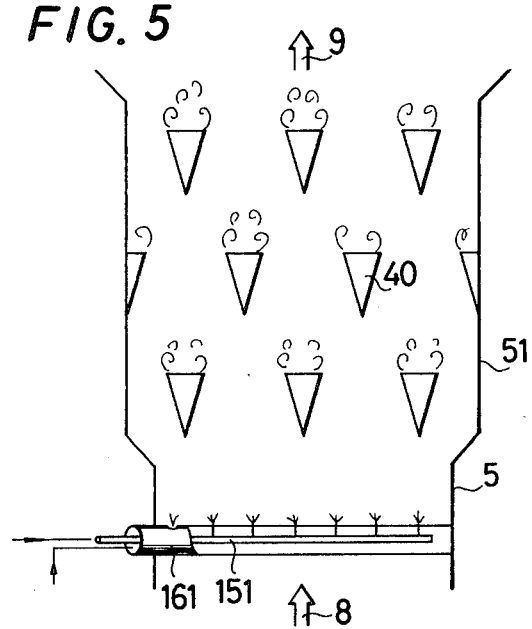
FIG. 5 is a sectional view of a duct of the turbine showing an arrangement of silencers according to the present invention.
Figure 6:
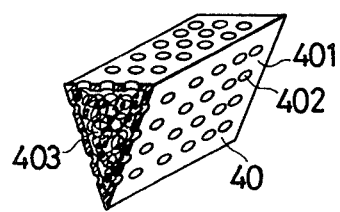
FIG. 6 is a section view of an embodiment of a silencer according to the present invention.

Referring to FIGS. 5 and 6, an embodiment of a silencer and its arrangement according to the present invention will be described hereinafter in detail. The silencers 40 each comprise a casing 401 triangularly shaped in its section and made of a plate with a plurality of holes 402, and rock wool 403 contained in the casing 401. The silencers 40 are arranged zigzag in the duct 5 with respect to the flow direction of the exhaust gas with each end of the silencers secured to the wall 51 of the duct 5. The silencers bring eddies of the exhaust gas over the silencers. The exhaust gas flowing up between the silencers arranged in the laterally adjacent relation are decelerated by resistance of the silencers disposed downstream of the formers. Therefore, good mixing of the exhaust gas and the reducing agent is effected and the exhaust gas can contact with the reducing agent for a long time so that reduction of the NO$_x$ is furthered.

The reducing agents such as the ammonia (NH$_3$) and the urea (CO(NH$_2$)$_2$) are used for reduction of the NO$_x$ in the presence of the catalyst. Therefore, it is necessary for such reducing agents to provide a catalyst layer.

Figure 8:
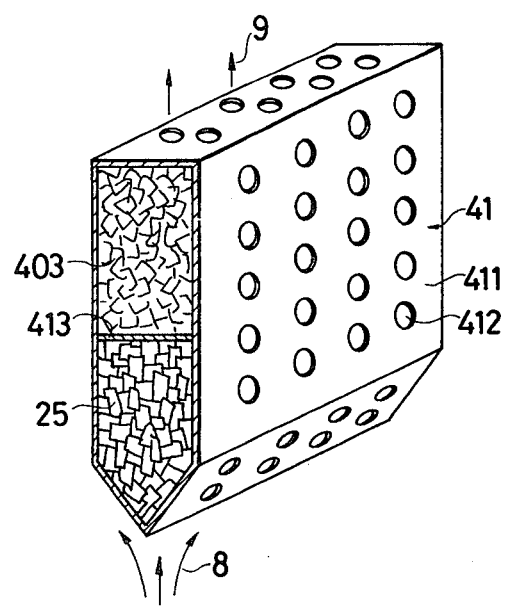
FIGS. 8 and 9 each are section views of embodiments of a silencer according to the present invention.

An embodiment of arrangement of the catalyst layer will be described hereinafter, referring to FIGS. 1 and 8. In FIG. 8, an embodiment of a silencer 41 according to the present invention is shown. The silencer 41 comprises a casing 411 formed of a plate with a plurality of holes 412, a partition plate 413, rock wool 403 contained in an upper compartment defined by the partition plate 413 and the upper portion of the casing 411, and a catalyst layer 25 of a plurality of pieces contained in a lower compartment defined by the partition plate 413 and the lower portion of the casing 411, which pieces each comprise titanium as a main component, iron, molybdenum, vanadium and iron sulfate. The outward shape of the the silencer 41 is the same as the conventional silencer 4 of FIG. 1, the silencers 41 are arranged in the same manner as the arrangement of the silencer 4. In this construction, the catalyst layer 25 is disposed so as to face the exhaust gas flowing up so that the catalyst efficiently functions without decrease of silencing effect.

Figure 9:
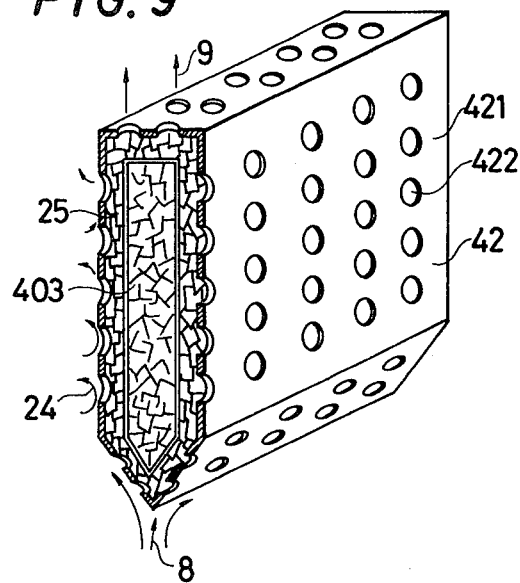

Another embodiment of the silencer according to the present invention will be described referring to FIG. 9. The silencer 42 has the same casing 421 with a plurality holes 422 as the casing 411, a catalyst layer 25 disposed along the inner face of the casing 421, and rock wool 403 disposed in the catalyst layer 25. The silencer 42 is arranged in the same manner as the silencer 41, whereby catalyst and silencing function can be effected at the same time. In this construction, the exhaust gas 8 flows along the side of the silencer 42 to make eddies 24. In the vicinity of the eddies 24, the catalyst 25 is disposed so that the exhaust gas 8 can contact with the catalyst layer 25 enough. Further the catalyst layer 25 is disposed along the flow of the exhaust gas, so that the exhaust gas 8 can contact with the catalyst for a long time to reduce the $NO_x$ enough.

Figure 7:
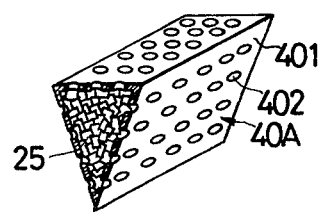
FIG. 7 is a section view of a catalyst holder according to the present invention.

In FIG. 7, shown is a catalyst holder 40A which comprises the same casing 401 as FIG. 6, and catalyst 25 contained in the casing 401. The catalyst holders 40A can be used by substituting them for part of the silencers 40 of FIG. 5. For example, instead of two layers of the silencers 40, the catalyst holders 40A can be disposed in the same positions as the two layers of the silencers 40, whereby good mixture of the exhaust gas and the reducing agent can be effected, the contacting time can be elongated, and reducing reaction of the $NO_x$ can be promoted, so that the $NO_x$ can be sufficiently reduced.

As described above according to the present invention, the reducing agent effecting selective catalytic reaction of reduction with the $NO_x$ is injected into the duct of the gas turbine in state of liquid so that a little amount of the reducing agent will be enough to reduce the $NO_x$ whereby it results in being economical and construction of a compact type injection apparatus.

Since the reducing agent is injected into the duct for exhaust of the exhaust gas from the turbine, the reducing agent does not bring any problem of erosion or corrosion into members constructing high temperature gas passages such as turbine blades and the combustor, and any bad influence on the turbine efficiency.

Further if the apparatus for treatment of turbine exhaust gas according to the present invention is employed conbined with a combustor constructed so as to prevent generation of the $NO_x$, advantages that consumption of the reducing agent becomes small and the $NO_x$ is largely reduced can be caused.

What is claimed is:

1. Apparatus for treatment of combustion gas containing nitrogen oxides exhausted from a gas turbine that extracts work from high pressure combustion gases obtained from a combustion chamber burning fuel and compressed air, the apparatus for treatment being mounted within an exhaust duct leading from the turbine to the environment and including means arranged in the exhaust duct for silencing sound, wherein the improvement comprises:

means for containing reagent liquid including a reagent that will reduce the nitrogen oxides;
   means arranged in the exhaust duct for holding catalyst including a plurality of gas permeable containers extending across the exhaust duct transversely with respect to the flow of the combustion gases through the exhaust duct; said plurality of gas permeable containers having intervals, therebetween in a direction transverse to the flow of the combustions gas;
   catalyst, within each of said containers, that increases the reduction reaction between the reagent and the nitrogen oxides contained within the combustion gas;
   a plurality of atomizer means for atomizing the reagent liquid with air while injecting the reagent liquid upstream of said containers, so that the water of the reagent liquid cools the combustion gases to a temperature suitable for reaction with the reagent; said atomizer means including a plurality of liquid nozzles and an immediately adjacent plurality of air nozzles; said atomizer means further including a compressor for the gas turbine, air conduit means conducting pressurized air from said compressor commonly to all of said air nozzles, liquid conduit means conducting the reagent liquid from said means for containing reagent liquid commonly to all of said liquid nozzles, a liquid pump within said liquid conduit means for pressurizing the reagent liquid, valve means within said air conduit means for controlling the flow of pressurized air to said air nozzles, and valve means within said liquid conduit means for controlling the flow of pressurized reagent liquid to said liquid nozzles.

2. The apparatus for treatment of combustion gas defined in claim 1, wherein said gas permeable containers contain said means for silencing sound, said gas permeable containers having a triangular cross section and being arranged zigzag with respect to the combustion gas flow.

3. The apparatus for treatment of combustion gas as defined in claim 1, wherein the sound silencing means comprises rock wool, said gas permeable containers each having a catalyst layer along the inner face thereof and the rock wool surrounded by the catalyst layer.

4. The apparatus for treatment for combustion gas as defined in claim 1, wherein the sound silencing means comprise rock wool, said gas permeable containers each having the rock wool downstream of the catalyst contained therein.

5. The apparatus for treatment of combustion gas as defined in claim 1, wherein said liquid nozzles and air nozzles are arranged transversely of the flow of the combustion gas through the exhaust dust.

6. The apparatus for treatment of combustion gas as defined in claim 5, wherein said liquid nozzles and air nozzles are disposed so that pressurized air flows from said air nozzles will traverse reagent liquid flows from said liquid nozzles.

7. Apparatus for treatment of combustion gas containing nitrogen oxides exhausted from a gas turbine that extracts work from high pressure combustion gases obtained from a combustion chamber burning fuel and compressed air, the apparatus for treatment being mounted within an exhaust duct leading from the turbine to the environment and including means for silencing sound, wherein the improvement comprises a source of reagent that will reduce nitrogen oxides; a source of water; means mixing the water with the reagent to provide a reagent liquid; valve means for controlling only the flow of reagent to said means mixing; valve means for separately controlling the flow of water to said means mixing; said means for silencing sound including a plurality of gas permeable containers extending across the exhaust duct transversely with respect to the flow of the combustion gases through the exhaust duct; catalyst, within each of said containers, that increases the reduction reaction between the reagent and the nitrogen oxides contained within the combustion gas; a plurality of atomizer means for atomizing the reagent liquid with air while injecting the reagent liquid upstream of said containers and towards said containers in the direction of combustion gas flow through said exhaust duct, so that the water will cool the combustion gases to a temperature more suitable for reaction with the reagent; said atomizer means including a plurality of liquid nozzles and an immediately adjacent plurality of air nozzles; said injector means further including a source of pressurized air, air conduit means for conducting pressurized air from said pressurized air source commonly to all of said air nozzles, liquid conduit means conducting the reagent liquid from said mixing means commonly to all of said liquid nozzles, a liquid pump within said liquid conduit means for pressurizing the reagent liquid, valve means within said air conduit means for controlling the flow of pressurized air to said air nozzles, and valve means within said liquid conduit means for controlling the flow of pressurized reagent liquid to said liquid nozzles.

* * * * *